(12) United States Patent
Sartori et al.

(10) Patent No.: US 12,108,367 B2
(45) Date of Patent: Oct. 1, 2024

(54) METHODS AND APPARATUS FOR RESOURCE SELECTION

(71) Applicant: Huawei Technologies Co., Ltd., Shenzhen (CN)

(72) Inventors: Philippe Sartori, Naperville, IL (US); Brian Classon, Palatine, IL (US); Vipul Desai, Palatine, IL (US); Weimin Xiao, Hoffman Estates, IL (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 369 days.

(21) Appl. No.: 17/712,855

(22) Filed: Apr. 4, 2022

(65) Prior Publication Data

US 2022/0225295 A1     Jul. 14, 2022

Related U.S. Application Data

(63) Continuation of application No. PCT/US2020/051945, filed on Sep. 22, 2020.

(60) Provisional application No. 63/068,612, filed on Aug. 21, 2020, provisional application No. 62/910,109, filed on Oct. 3, 2019.

(51) Int. Cl.
    *H04W 72/02*     (2009.01)
    *H04W 92/18*     (2009.01)

(52) U.S. Cl.
    CPC ............ *H04W 72/02* (2013.01); *H04W 92/18* (2013.01)

(58) Field of Classification Search
    None
    See application file for complete search history.

(56) References Cited

U.S. PATENT DOCUMENTS

| 2021/0068078 A1* | 3/2021 | Medina | H04W 72/02 |
| 2021/0314749 A1* | 10/2021 | Kwak | H04W 4/40 |
| 2022/0279393 A1* | 9/2022 | Di Girolamo | H04W 36/08 |

FOREIGN PATENT DOCUMENTS

EP     3456144 A1     3/2019

OTHER PUBLICATIONS

Vivo, "Discussion on mode 2 resource allocation mechanism," Agenda Item 7.2.4.2.2, 3GPP TSG RAN WG1 #96bis, R1-1904074, Xi'an, China, Apr. 8-12, 2019, 11 pages.
Ericsson, "PHY Layer procedures for sidelink," Agenda Item 7.2.4.5, 3GPP TSG-RAN WG1 Meeting #97, R1-1907143, Reno, Nevada, May 13-17, 2019, 14 pages.

(Continued)

*Primary Examiner* — Angela Nguyen
(74) *Attorney, Agent, or Firm* — Slater Matsil, LLP

(57) ABSTRACT

A method includes performing sensing to determine resources for a sidelink transmission between a first device and a second device; obtaining channel information associated with a first subset of the resources; generating resource selection probabilities for a second subset of the resources, the resource selection probabilities being generated in accordance with the channel information and sensing information derived from the sensing; selecting a resource from the resources in accordance with the resource selection probabilities, the resource being used for the sidelink transmission; and transmitting, to the second device, the sidelink transmission over the selected resource.

30 Claims, 9 Drawing Sheets

(56) References Cited

OTHER PUBLICATIONS

Asustek, "Discussion on Mode 2 resource allocation in NR V2X," Agenda Item 7.2.4.2.2, 3GPP TSG RAN WG1 #97, R1-1907368, Reno, Nevada, May 13-17, 2019, 4 pages.

Intel Corporation, "UE-Autonomous Resource Allocation for NR V2X Sidelink Communication," Agenda Item 7.2.4.2.2, 3GPP TSG TAN WG1 Meeting #98, R1-1908635, Prague, Czech Republic, Aug. 26-30, 2019, 34 pages.

NTT Docomo, Inc., "NR Sidelink Resource Allocation Mechanism Mode 2," Agenda Item 7.2.4.2.2, 3GPP TSG RAN WG1 #98, Prague, Czech Republic, Aug. 26-30, 2019, 7 pages.

Asia Pacific Telecom, Discussion on sidelink resource allocation mode 2. 3GPP TSG-RAN WG1 Meeting #98, Prague, Czech Republic, Aug. 26-30, 2019, R1-1908929, 6 pages.

* cited by examiner

METHODS AND APPARATUS FOR RESOURCE SELECTION

CROSS-REFERENCE TO RELATED APPLICATIONS

This application is a continuation of International Application No. PCT/US2020/051945, filed on Sep. 22, 2020, entitled "Methods and Apparatus for Resource Sensing," which claims the benefit of U.S. Provisional Application No. 62/910,109, filed on Oct. 3, 2019, entitled "Methods and Apparatus for Resource Sensing," and U.S. Provisional Application No. 63/068,612, filed on Aug. 21, 2020, entitled "Methods and Apparatus for Resource Selection," which applications are hereby incorporated herein by reference in their entirety.

TECHNICAL FIELD

The present disclosure relates generally to methods and apparatus for digital communications, and, in particular embodiments, to methods and apparatus for resource selection.

BACKGROUND

Vehicle-to-everything (V2X) communications will play an essential role in the evolution of the automotive industry in the near future and revolutionize the field. Dedicated short-range communication (DSRC) by IEEE and the Third Generation Partnership Project (3GPP) long-term evolution—vehicular (LTE-V) developed by 3GPP are two major vehicular communication technologies developed thus far.

The 3GPP has also approved a work item for the standardization of the fifth generation (5G) new radio access technology (NR) V2X wireless communication with the goal of providing 5G-compatible high-speed reliable connectivity for vehicular communications in the near future for applications such as safety systems and autonomous driving. High data rates, low latencies, and high reliabilities are some of the key areas that are being investigated and standardized.

In many situations, resource allocation includes randomly selecting resources from a set of resources. Random resource selection is typically not suitable when link adaptation or power control is being used. Furthermore, where unicast transmissions are supported, resource availability may be insufficient for good performance. Therefore, there is a need for methods and apparatus for resource selection that utilizes more than simple random selection of available resources.

SUMMARY

According to a first aspect, a method implemented by a first device is provided. The method comprising: performing, by the first device, sensing to determine resources for a sidelink transmission between the first device and a second device; obtaining, by the first device, channel information associated with a first subset of the resources; generating, by the first device, resource selection probabilities for a second subset of the resources, the resource selection probabilities being generated in accordance with the channel information and sensing information derived from the sensing; selecting, by the first device, a resource from the resources in accordance with the resource selection probabilities; and transmitting, by the first device to the second device, the sidelink transmission over the selected resource.

In a first implementation form of the method according to the first aspect, generating the resource selection probabilities comprising: setting, by the first device, resource selection probabilities of resources having sensing information meeting a specified first threshold; and adjusting, by the first device, the resource selection probabilities of a third subset of the resources having sensing information meeting a specified second threshold, the adjusting being in accordance with the channel information.

In a second implementation form of the method according to the first aspect or any preceding implementation form of the first aspect, adjusting the resource selection probabilities comprising: increasing, by the first device, a resource selection probability associated with a first resource when channel information associated with the first resource indicates that the first resource has low energy; and decreasing, by the first device, a resource selection probability associated with a second resource when channel information associated with the second resource indicates that the second resource has high energy.

In a third implementation form of the method according to the first aspect or any preceding implementation form of the first aspect, selecting the resource comprising selecting a resource having a highest resource selection probability.

In a fourth implementation form of the method according to the first aspect or any preceding implementation form of the first aspect, selecting the resource comprising randomly selecting the resource from a plurality of resources having resource selection probability substantially equal to a highest resource selection probability.

In a fifth implementation form of the method according to the first aspect or any preceding implementation form of the first aspect, the channel information comprising at least one of channel quality information (CQI) of the resources, quality indicators of the resources, rank indicators (RIs) of the resources, information of the resources used for prior transmissions by the second device, or information estimated in accordance with prior transmissions by the second device.

In a sixth implementation form of the method according to the first aspect or any preceding implementation form of the first aspect, the sensing information comprising at least one of a reference signal received power (RSRP) measurement, resource allocation information, or resource reservation information.

According to a second aspect, a method implemented by a first device is provided. The method comprising: performing, by the first device, sensing to determine resources for a sidelink transmission between the first device and a second device; obtaining, by the first device, signal quality information for a first subset of the resources; obtaining, by the first device, channel information associated with a second subset of the resources; adjusting, by the first device, the signal quality information for a third subset of the resources, the signal quality information being adjusted in accordance with the channel information; selecting, by the first device, a resource from the resources in accordance with the adjusted signal quality information; and transmitting, by the first device to a second device, the sidelink transmission over the selected resource.

In a first implementation form of the method according to the second aspect, selecting the resource comprising: determining, by the first device, a set of available resources in accordance with the adjusted signal quality information; and selecting, by the first device, the resource from the set of available resources.

In a second implementation form of the method according to the second aspect or any preceding implementation form of the second aspect, adjusting the signal quality information comprising modifying, by the first device, the signal quality information for the third subset of the resources in accordance with the channel information.

In a third implementation form of the method according to the second aspect or any preceding implementation form of the second aspect, modifying the signal quality information comprising reducing the signal quality information.

In a fourth implementation form of the method according to the second aspect or any preceding implementation form of the second aspect, further comprising reducing the signal quality information for a fourth subset of the resources comprising resources used for prior transmissions by the second device.

According to a third aspect, a method implemented by a first device is provided. The method comprising: performing, by the first device, sensing to determine resources for a sidelink transmission between the first device and a second device; selecting, by the first device, a first subset of the resources in accordance with sensing information derived from the sensing; obtaining, by the first device, channel information associated with a second subset of the resources; modifying, by the first device, the first subset of the resources in accordance with the channel information; selecting, by the first device, a resource from the resources in accordance with the modified first subset of the resources; and transmitting, by the first device to the second device, the sidelink transmission over the selected resource.

In a first implementation form of the method according to the third aspect, modifying the first subset of the resources comprising removing a resource from the first subset of the resources when channel information associated with the resource indicates high energy.

In a second implementation form of the method according to the third aspect or any preceding implementation form of the third aspect, the modified first subset of the resources being associated with the second device.

According to a fourth aspect, a first device is provided. The first device comprising: one or more processors; and a non-transitory memory storage comprising instructions that, when executed by the one or more processors, cause the first device to: perform sensing to determine resources for a sidelink transmission between the first device and a second device; obtain channel information associated with a first subset of the resources; generate resource selection probabilities for a second subset of the resources, the resource selection probabilities being generated in accordance with the channel information and sensing information derived from the sensing; selecting, by the first device, a resource from the resources in accordance with the resource selection probabilities; and transmit, to the second device, the sidelink transmission over the selected resource.

In a first implementation form of the first device according to the fourth aspect, the instructions further causing the first device to set resource selection probabilities of resources having sensing information meeting a specified first threshold; and adjust the resource selection probabilities of a third subset of the resources having sensing information meeting a specified second threshold, the adjusting being in accordance with the channel information.

In a second implementation form of the first device according to the fourth aspect or any preceding implementation form of the fourth aspect, the instructions further causing the first device to increase a resource selection probability associated with a first resource when channel information associated with the first resource indicates that the first resource has low energy; and decrease a resource selection probability associated with a second resource when channel information associated with the second resource indicates that the second resource has high energy.

In a third implementation form of the first device according to the fourth aspect or any preceding implementation form of the fourth aspect, the instructions further causing the first device to select a resource having a highest resource selection probability.

In a fourth implementation form of the first device according to the fourth aspect or any preceding implementation form of the fourth aspect, the instructions further causing the first device to randomly select the resource from a plurality of resources having resource selection probability substantially equal to a highest resource selection probability.

In a fifth implementation form of the first device according to the fourth aspect or any preceding implementation form of the fourth aspect, the channel information comprising at least one of CQI of the resources, quality indicators of the resources, RIs of the resources, information of the resources used for prior transmissions by the second device, or information estimated in accordance with prior transmissions by the second device.

In a sixth implementation form of the first device according to the fourth aspect or any preceding implementation form of the fourth aspect, the sensing information comprising at least one of a RSRP measurement, resource allocation information, or resource reservation information.

According to a fifth aspect, a first device is provided. The first device comprising: one or more processors; and a non-transitory memory storage comprising instructions that, when executed by the one or more processors, cause the first device to: perform sensing to determine resources for a sidelink transmission between the first device and a second device; obtain signal quality information for a first subset of the resources; obtain channel information associated with a second subset of the resources; adjust the signal quality information for a third subset of the resources, the signal quality information being adjusted in accordance with the channel information; select a resource from the resources in accordance with the adjusted signal quality information; and transmit, to a second device, the sidelink transmission over the selected resource.

In a first implementation form of the first device according to the fifth aspect, the instructions further causing the first device to determine a set of available resources in accordance with the adjusted signal quality information; and select the resource from the set of available resources.

In a second implementation form of the first device according to the fifth aspect or any preceding implementation form of the fourth aspect, the instructions further causing the first device to modify the signal quality information for the third subset of the resources in accordance with the channel information.

In a third implementation form of the first device according to the fifth aspect or any preceding implementation form of the fourth aspect, the instructions further causing the first device to reduce the signal quality information.

In a fourth implementation form of the first device according to the fifth aspect or any preceding implementation form of the fourth aspect, the instructions further causing the first device to reduce the signal quality information for a fourth subset of the resources comprising resources used for prior transmissions by the second device.

According to a sixth aspect, a first device is provided. The first device comprising: one or more processors; and a non-transitory memory storage comprising instructions that, when executed by the one or more processors, cause the first device to: perform sensing to determine resources for a sidelink transmission between the first device and a second device; select a first subset of the resources in accordance with sensing information derived from the sensing; obtain channel information associated with a second subset of the resources; modify the first subset of the resources in accordance with the channel information; select a resource from the resources in accordance with the modified first subset of the resources; and transmit, to the second device, the sidelink transmission over the selected resource.

In a first implementation form of the first device according to the sixth aspect, the instructions further causing the first device to remove a resource from the first subset of the resources when channel information associated with the resource indicates high energy.

In a second implementation form of the first device according to the sixth aspect or any preceding implementation form of the fourth aspect, the modified first subset of the resources being associated with the second device.

An advantage of a preferred embodiment is that consideration is given to the channel condition in the selection of resources for sidelink communications. Knowledge of channel condition supports unicast operation, link adaptation, and power control.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The structure and use of disclosed embodiments are discussed in detail below. It should be appreciated, however, that the present disclosure provides many applicable concepts that can be embodied in a wide variety of specific contexts. The specific embodiments discussed are merely illustrative of specific structure and use of embodiments, and do not limit the scope of the disclosure.

Figure 1:
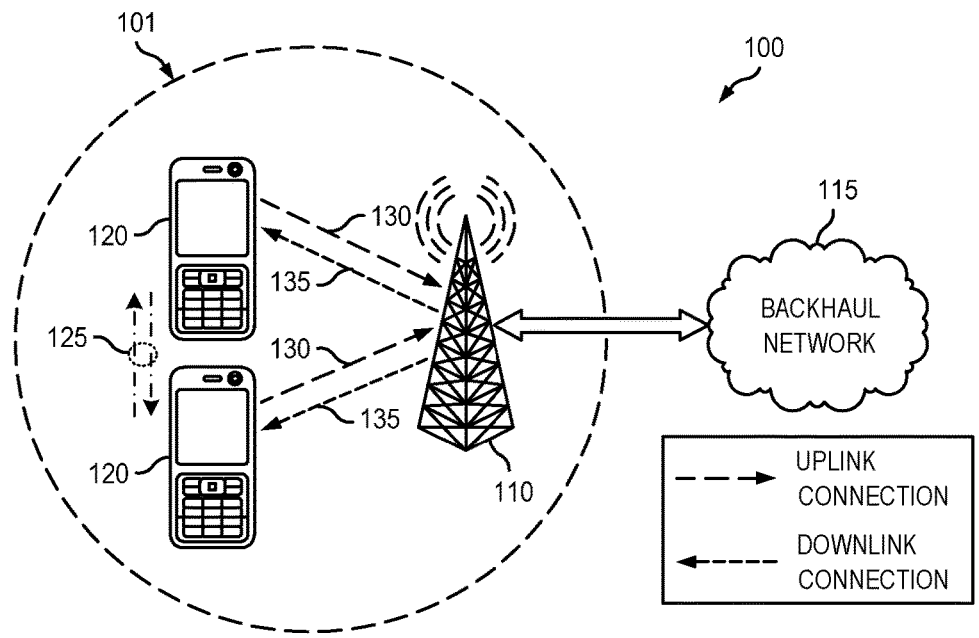
FIG. 1 illustrates an example communications system.

FIG. 1 illustrates an example communications system 100. Communications system 100 includes an access node 110 serving user equipments (UEs) with coverage 101, such as UEs 120. In a first operating mode, communications to and from a UE passes through access node 110 with a coverage area 101. The access node 110 is connected to a backhaul network 115 for connecting to the internet, operations and management, and so forth. In a second operating mode, communications to and from a UE do not pass through access node 110, however, access node 110 typically allocates resources used by the UE to communicate when specific conditions are met. Communications between a pair of UEs 120 can use a sidelink connection (shown as two separate one-way connections 125). In FIG. 1, the sideline communication is occurring between two UEs operating inside of coverage area 101. However, sidelink communications, in general, can occur when UEs 120 are both outside coverage area 101, both inside coverage area 101, or one inside and the other outside coverage area 101. Communication between a UE and access node pair occur over uni-directional communication links, where the communication links between the UE and the access node are referred to as uplinks 130, and the communication links between the access node and UE is referred to as downlinks 135.

Access nodes may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, base stations, access points, transmission points (TPs), transmission-reception points (TRPs), cells, carriers, macro cells, femtocells, pico cells, and so on, while UEs may also be commonly referred to as mobile stations, mobiles, terminals, users, subscribers, stations, and the like. Access nodes may provide wireless access in accordance with one or more wireless communication protocols, e.g., the Third Generation Partnership Project (3GPP) long term evolution (LTE), LTE advanced (LTE-A), 5G, 5G LTE, 5G NR, sixth generation (6G), High Speed Packet Access (HSPA), the IEEE 802.11 family of standards, such as 802.11a/b/g/n/ac/ad/ax/ay/be, etc. While it is understood that communications systems may employ multiple access nodes capable of communicating with a number of UEs, only one access node and two UEs are illustrated for simplicity.

In Third Generation Partnership Project (3GPP) fifth generation (5G) new radio access technology (NR) vehicle-to-everything (V2X), a resource allocation mode where a UE autonomously selects resources is being standardized. This mode is referred to as "mode 2", and is somewhat akin to "mode 4" resource allocation of 3GPP long term evolution (LTE) V2X. However, NR V2X will have several improvements over LTE V2X, which will appear either in Release-16 or Release-17, the improvements include:

The ability to do "true" unicast communication at the physical layer;

The existence of a feedback channel (a physical sidelink feedback channel (PSFCH)) to send at least hybrid automatic repeat request (HARQ) feedback, and likely more channel quality information (CQI) reports in the future, CQI typically is a combination of rank indicator (RI), channel state information (CSI), pre-coding matrix indicator (PMI), and so on;

The ability to receive CQI reports.

NR mode 2 and LTE V2X mode 4 have many commonalities. In particular, for both modes, UEs rely on sensing the channel to determine unoccupied resources. However, for LTE V2X mode 4, the selected resources are not based on the channel quality. The selected resources are either obtained by channel reciprocity or sounding. In order for NR V2X mode 2 to deliver high performance, there is a need for UEs to account for channel information in the resource sensing selection.

For the purpose of sidelink communications, where communications occur between UEs without the involvement of an access node (except with the potential allocation of the resources by the access node), the notion of resource pools (RPs) was introduced for the LTE sidelink, and is being reused for NR sidelink. A resource pool is a set of resources that can be used for sidelink communication. Resources in a resource pool are configured for different channels including control channels (e.g., physical sidelink control channel (PSCCH)), shared channels (e.g., physical sidelink shared channel (PSSCH)), feedback channels, synchronization signals, reference signals, broadcast channels (e.g., master information block (MIB)), and so on. The technical standard defines rules on how the resources are shared and used for a particular configuration of the resource pool. However, the rules usually allow for a possibility of conflicts between multiple communications by a UE. For example, if a UE needs to transmit and receive at the same time, there is a conflict for the UE because of the half-duplex operation constraint. Another example is when a UE needs to transmit signals beamformed to different directions through a same antenna. If the antenna employs analog beamforming, which is the common practice at high frequencies, the UE cannot always perform the communications simultaneously in multiple directions.

Figure 2:
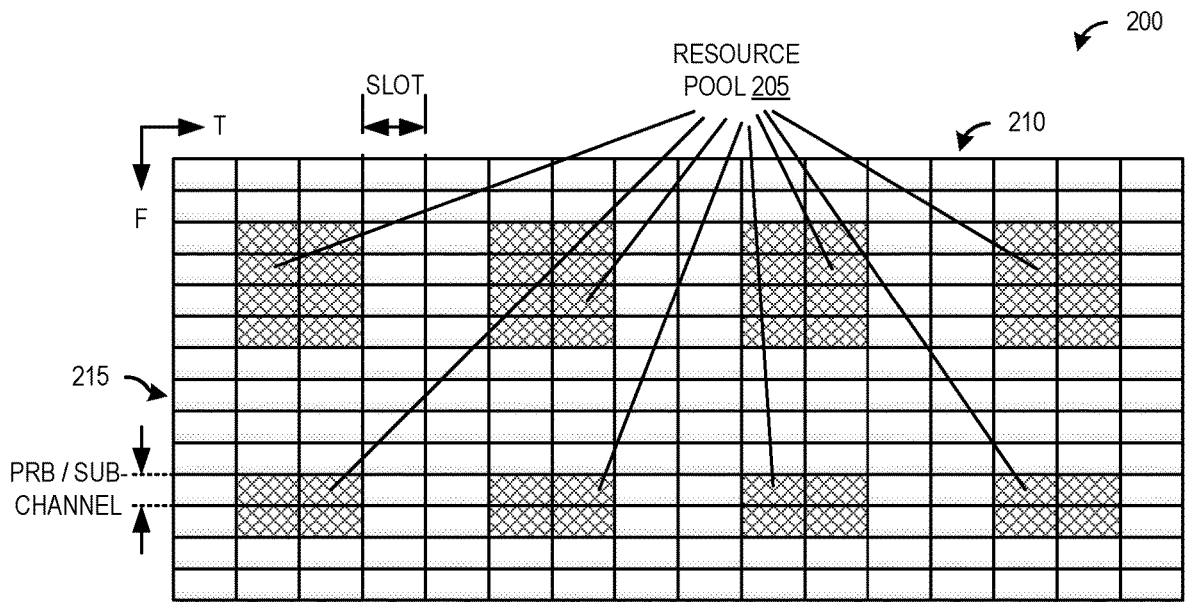
FIG. 2 illustrates a diagram of an example resource pool.

According to the current agreements in 3GPP working group RAN1, a resource pool for sidelink can be configured in units of slots in the time domain and physical resource blocks (PRBs) or sub-channels in the frequency domain. A sub-channel consists of one or more PRBs. FIG. 2 illustrates a diagram 200 of an example resource pool 205. Resource pool 205 is shown in a time-frequency resource grid with time-domain slots (such as slot 210) and frequency-domain PRBs or sub-channels (such as sub-channel 215). The resource grid is configured in a band, a carrier component (CC), a bandwidth part (BWP), and so on. The number of PRBs in a resource pool can differ in each slot. In addition, the location of the resource pool can differ in each slot. The resource pool may also be absent in any particular slot.

For NR mobile broadband (MBB), each PRB in the resource grid is defined as a slot comprising 14 consecutive orthogonal frequency division multiplexed (OFDM) symbols in the time domain and 12 consecutive subcarriers in the frequency domain, i.e., each resource block contains 12×14 resource elements (REs). When used as a frequency-domain unit, a PRB denotes 12 consecutive subcarriers. There are 14 symbols in a slot when a normal cyclic prefix is used and 12 symbols in a slot when an extended cyclic prefix is used. The duration of a symbol is inversely proportional to the sub-carrier spacing (SCS). For a {15, 30, 60, 120} kHz SCS, the duration of a slot is {1, 0.5, 0.25, 0.125} ms, respectively. A 1 ms subframe spans {1, 2, 4, 8} or equivalently $2\mu$ slots where $\mu=\{0, 1, 2, 3\}$ for {15, 30, 60, 120} kHz SCS, respectively. Each PRB can be allocated to combinations of control channel, shared channel, feedback channel, reference signals, and so on. In addition, some REs of a PRB can be reserved. A similar structure is likely to be used on the sidelink as well. A communication resource can be a PRB, a set of PRBs, a code (if code division multiple access (CDMA) is used, similarly as for the physical uplink control channel (PUCCH)), a physical sequence, a set of REs, and so on.

A feedback channel in the NR sidelink is used for communication of HARQ feedback, which comprises an acknowledgment (ACK) or a negative acknowledgement (NACK) of successful receipt and decode of a block of data in a shared channel. The amount of ACK/NACK (A/N) information is small and, therefore, the PSFCH does not need to be configured in every slot of a resource pool if the latency constraints allow it. Instead, as agreed in RAN1, a PSFCH can be configured on one or a few symbols every N slots in the resource pool, where N takes integer values such as 1, 2, 4, etc. Therefore, if slot $n_f$ in the resource pool contains PSFCH resources, so do slots $n_{f+N}$, $n_{f+2N}$, $n_{f+3N}$, . . . . The notation k mod $N=n_f$ can be used to indicate each slot k that contains a PSFCH 'instance' or a PSFCH 'opportunity.'

When a transmitting UE (source UE or TxUE) transmits signals (e.g., for a shared channel carrying data or payload) to a receiving UE (destination UE or RxUE), the destination UE attempts to demodulate and decode the signals. If the process (e.g., the decoding) is successful, the destination UE sends an ACK to the source UE; otherwise, the destination UE sends a NACK to the source UE. An example of an ACK is a logical or binary "1" while a NACK is a logical or binary "0". The reverse may also be utilized. Whether the destination UE sends an ACK/NACK depends on the standard and the HARQ process configuration. There are generally four possible cases, which are shown in Table 1.

TABLE 1

Possible ACK/NACK transmission cases.

| Transmit ACK | Transmit NACK | Remarks |
| --- | --- | --- |
| Y | Y | Called option 2 in RAN1 agreements; useful for unicast and groupcast |
| N | Y | Called option 1 in RAN1 agreements; useful for groupcast |
| Y | N | Similar to IEEE 802.11 |
| N | N | E.g., when a HARQ process is not configured; useful for broadcast |

A typical operation is for the source UE to transmit a control channel and a shared channel in the same slot. The control channel includes sidelink control information (SCI) indicating the scheduling of the shared channel, where the scheduling provides information for the location (e.g., start and size) of the shared channel, the modulation-coding scheme (MCS), and so forth. The control channel may include additional information, such as fields related to the HARQ process, such as a redundancy version, a new data indicator, and a HARQ process number. If the destination UE is unable to decode the control channel for a single transmission, no feedback signal should be transmitted by the destination UE. The same concept is applicable even if the transmission of the shared channel spans multiple slots with the control channel being transmitted in the first slot. However, if a periodic or semi-persistent transmission is scheduled for a source UE, and the destination UE fails to receive a transport block (TB), the destination UE can send a NACK to the source UE.

Figure 3:
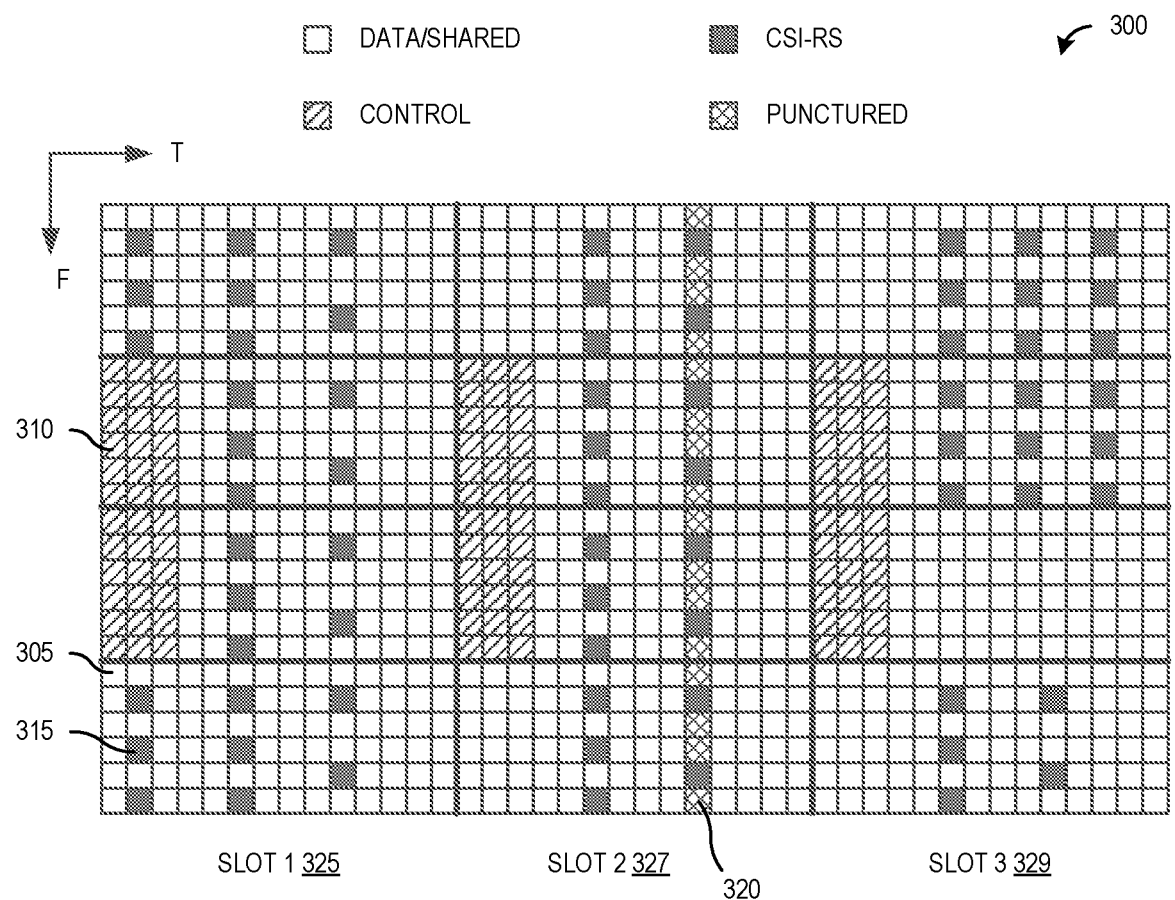
FIG. 3 illustrates a diagram of examples options for channel state information reference signal (CSI-RS) resources for the Uu link.

The channel state information reference signal (CSI-RS) is a reference signal used to obtain channel information on the Uu link (the link between access node and UE). A similar reference signal can be designed for sidelink (e.g., a sidelink CSI-RS (SL-CSI-RS)). When there is no CSI-RS, CQI can still be obtained, e.g., the CQI may be based on another RS (e.g., a demodulation reference signal (DMRS)), or through channel reciprocity. FIG. 3 illustrates a diagram 300 of examples options for CSI-RS resources for the Uu link. REs may be reserved for data (e.g., RE 305), control (e.g., RE 310), or CSI-RS (e.g., 315). Some REs may be punctured (e.g., RE 320). REs reserved for the CSI-RS may be located in different locations in different slots.

Similar RE allocation patterns could be reused on the sidelink. In terms of bandwidth, the CSI-RS can span the whole bandwidth of a CC or a BWP as is the case in slot 1 325 and slot 2 327. Alternatively, the CSI-RS can be located in a partial band as is the case in slot 3 329. Different densities of REs are also possible over frequency, such as the case of slot 1 325 and slot 2 327, and/or over time, such as the case of slot 3 329.

Figure 4:
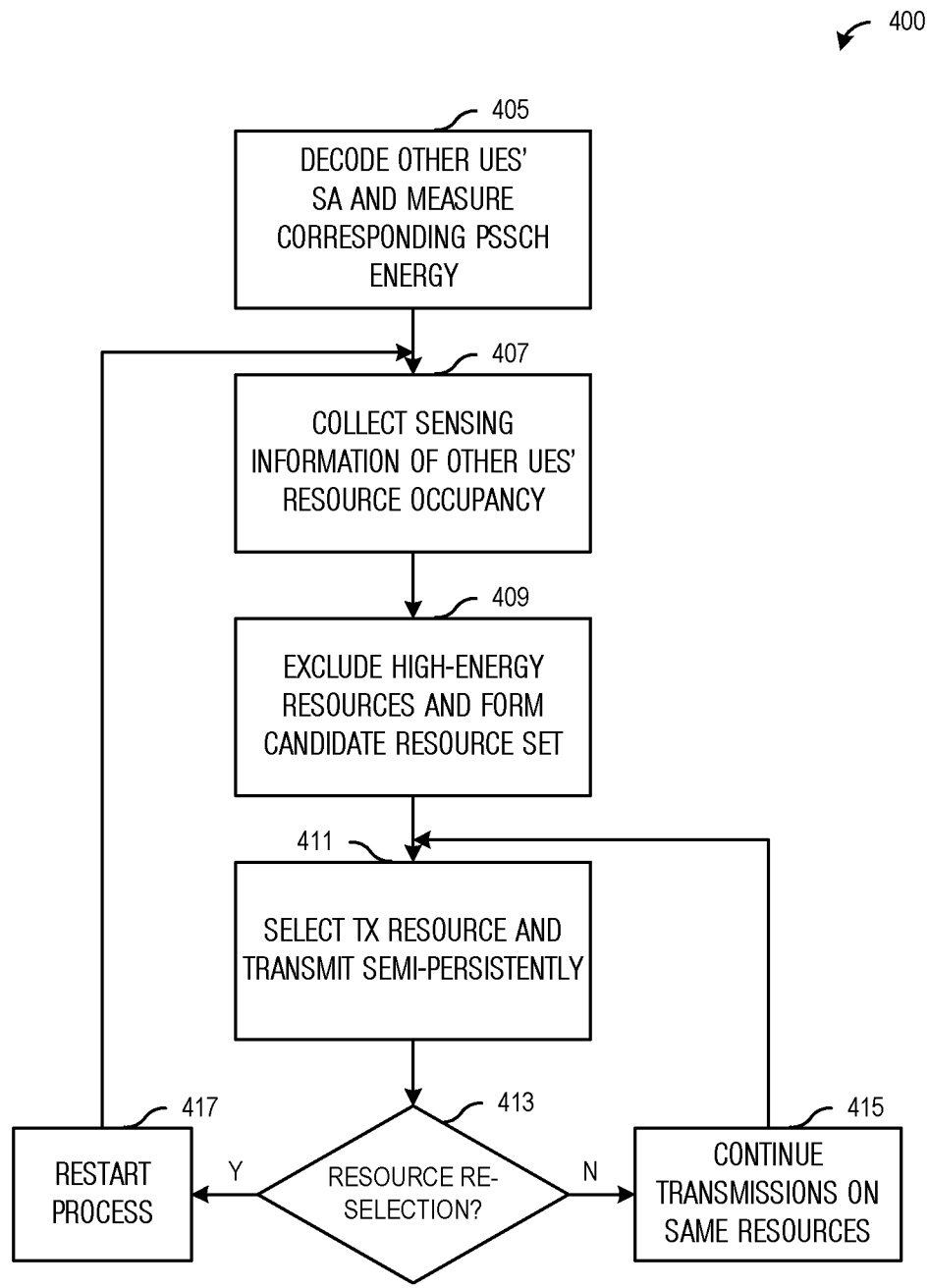
FIG. 4 illustrates a flow diagram of operations occurring in a prior art resource allocation procedure in Long Term Evolution Vehicle-to-everything (LTE V2X) mode 4.

FIG. 4 illustrates a flow diagram of operations 400 occurring in a prior art resource allocation procedure in LTE V2X mode 4. Operations 400 may be occurring at a source UE.

The source UE decodes other UEs' scheduling assignments (SAs) in the SCI and measures the corresponding PSSCH energy (block 405). The SCIs containing the SAs may be detected and decoded in PSCCHs. The decoded SAs include information regarding which resources in PSSCHs the other UEs will be making transmissions. The source UE measures the energy the resources in PSSCHs in accordance with the SAs. As an example, the SAs specify when and where the transmissions in the PSSCHs take place and the source UE measures the energy in the resources.

The source UE enters a resource selection phase (blocks 407, 409, and 411). In the resource selection phase, the source UE selects resources for a transmission based on sensing information collected for resources of the channels between the source UE and a destination UE. The resource selection phase may be as follows:
The source UE monitors the channel for a specified amount of time (block 407).
Resources that cannot be measured are automatically excluded;
The source UE decodes SCI to determine a) resource allocation, and b) if reservations are enabled;
The source UE measures the reference signal received power (RSRP) on each subchannel, and, combining it with the information obtained from the SCI, determines where the resources will be located in the future, with two assumptions:
If a resource is marked as 'reserved', it is assumed that it will repeat forever, and
The future RSRP is assumed to be the same as the one measured.
The sensing information collected includes resource allocations, reservations enabled or disabled, resource reservations, RSRP measurements, etc.

The source UE then determines the available resources in the selection window (block 409);
If at least 20% of resources are available, the UE can select a resource (block 411). The resource is randomly selected from the available resources.
If less than 20% of resources are available, the UE increases all thresholds by 3 dB (such as the RSRP threshold, for example), then repeats the procedure until at least 20% of the resources are available.
If resource re-selection is not to be performed (block 413), the source UE continues transmissions in the same selected resources (block 415). However, if resource re-selection is to be performed, the source UE restarts the process (block 417) by returning to block 407 to restart the resource selection phase.

Figure 5:
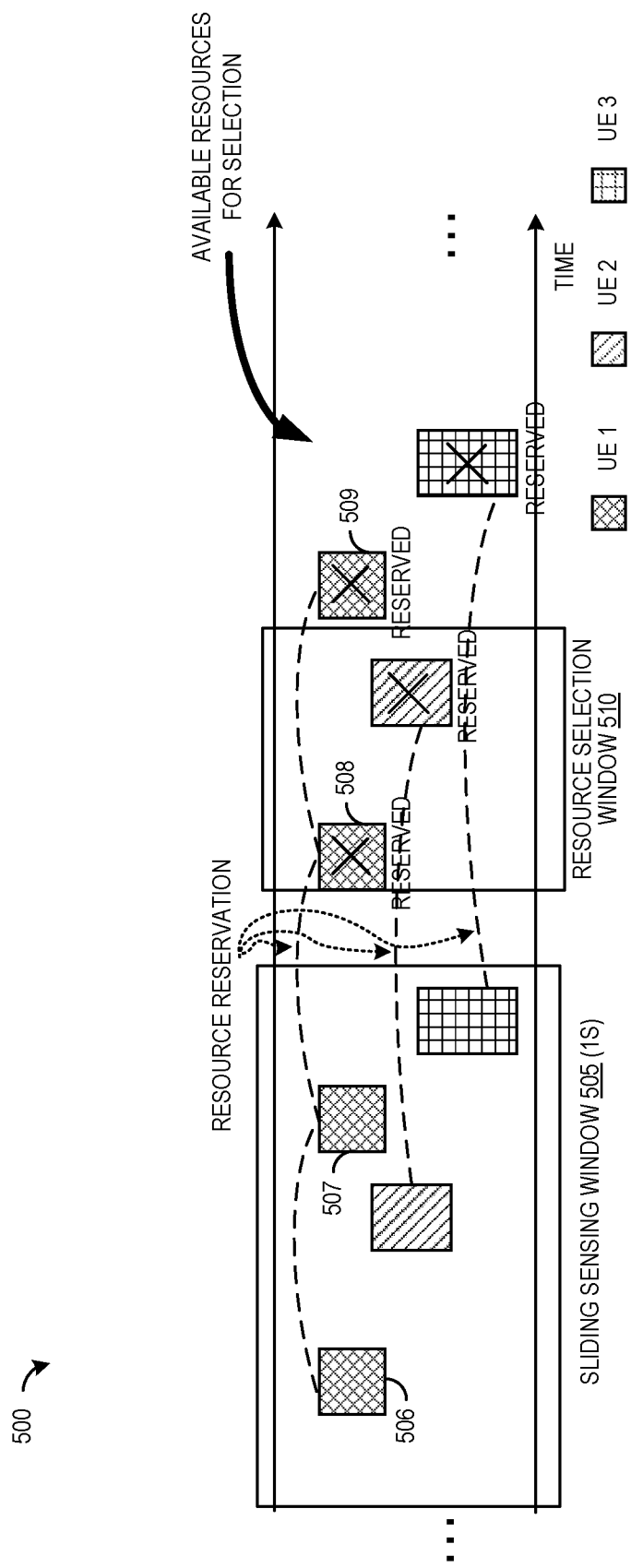
FIG. 5 illustrates a diagram of the prior art sensing phase of the resource allocation procedure in LTE V2X mode 4.

FIG. 5 illustrates a diagram 500 of the prior art sensing phase of the resource allocation procedure in LTE V2X mode 4. A sliding sensing window 505, with a 1 second duration, is monitored by the source UE for resources with energy (such as resources 506-507), based on SAs associated with the resources. The source UE is able to determine that some of the resources are allocated persistently or semi-persistently. Such resources are marked as being reserved, e.g., resources 508-509.

A resource selection window 510 is represented by a P×K matrix R=[$R_{i,j}$], where
P is the number of subframes in resource selection window 510;
K is the number of subchannels in the resource pool where a UE (i.e., the source UE) can transmit; and
$R_{i,j}$=1 if the subchannel was sensed as being of acceptable quality, and 0 otherwise. $R_{i,j}$=1 corresponds to the case where the source UE has sensed an RSRP value below the threshold on the subchannel AND the RSRP value is in the lowest 20% of all measured RSRP values. In addition, the total number of resources in resource selection window 510 is denoted as U (U=$\sum_{i=1}^{P}\sum_{j=1}^{K}R_{i,j}$). Each possible resource can be chosen with the same equal probability p=1/U.

For NR V2X mode 2 sidelink, the resource allocation procedure is likely to be similar to LTE V2X mode 4 sidelink. In particular, there is a sensing phase followed by a resource selection phase. However, for LTE V2X mode 4 sidelink, once the source UE has determined an acceptable set of resources (e.g., the resources that are below a RSRP threshold), the source UE randomly selects a resource from the set of resources. The random selection of resources is not acceptable for most use cases of NR V2X sidelink. As an example:
Unlike LTE V2X mode 4 sidelink, link adaptation (and possibly multiple antenna techniques) is applied. These techniques generally need to take into account some form of channel information.
Unlike LTE V2X mode 4 sidelink, the link in NR V2X sidelink can be unicast. In such a case, the information on the link between the source and destination UEs is more important than determining whether a resource is free (i.e., energy measured on the link is below an RSRP threshold) at the source UE.
Unlike LTE V2X mode 4 sidelink, power control in NR V2X sidelink may be used for unicast and groupcast links.

Consequently, there is a need for a sensing and resource allocation procedure that takes into account the channel information between the source UE and destination UE.

According to an example embodiment, methods and apparatus for resource allocation for NR V2X sidelink that considers channel quality information in the selection of resources for a sidelink transmission between a source UE and a destination UE is provided. In an embodiment, the channel quality information may be provided to the source UE by the destination UE. In another embodiment, the channel quality information may be determined by the source UE. In yet another embodiment, the channel quality information comprises channel quality information provided by the destination UE and channel quality information determined by the source UE.

Figure 6:
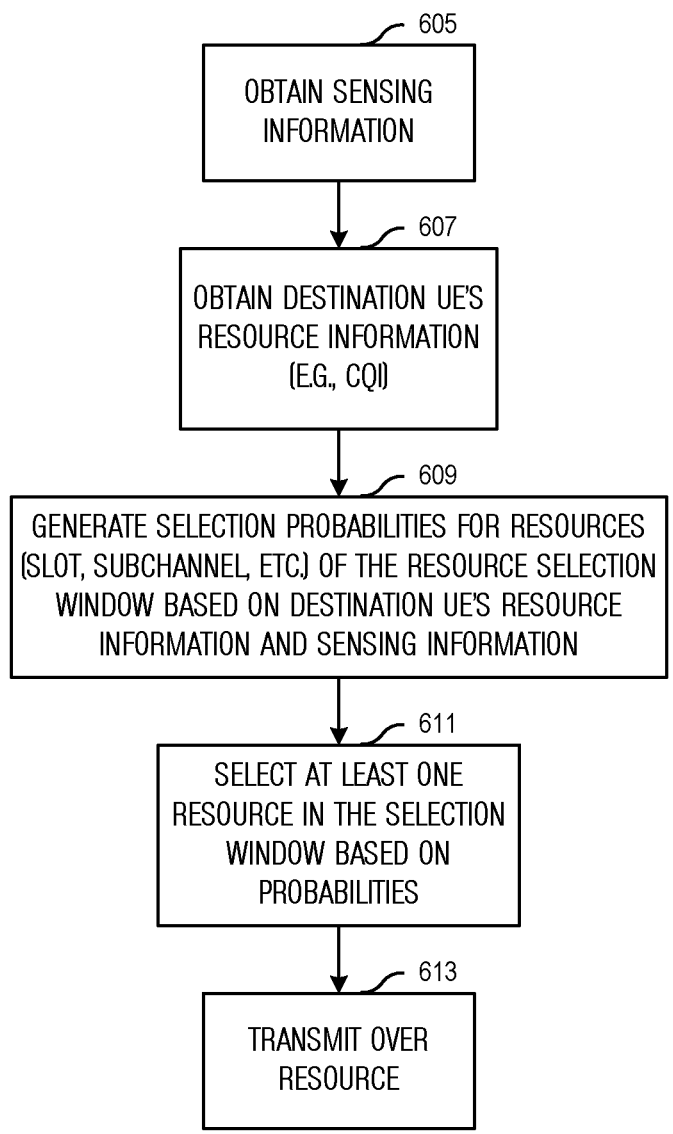
FIG. 6 illustrates a flow diagram of example operations occurring in a source user equipment (UE) performing resource selection according to example embodiments presented herein.

FIG. 6 illustrates a flow diagram of example operations 600 occurring in a source UE performing resource selection. Operations 600 may be indicative of operations occurring in a source UE (to become a TxUE in a sidelink transmission) as the source UE performs resource selection for the sidelink transmission to a destination UE (to become a RxUE in the sidelink transmission). Although the embodiments presented are for unicast operation, the example embodiments presented herein are operable for groupcast operation.

Operations 600 begin with the source UE obtaining sensing information (block 605). The source UE may obtain the sensing information in a manner similar to the source UE obtaining sensing information in LTE V2X mode 4, for example. As an example, the source UE monitors the channel for a specified amount of time, e.g., 1 second. The source UE obtains SAs and measures corresponding PSSCH energy in order to obtain sensing information. The source UE may also obtain sensing information from other devices, such as other UEs or access nodes (that are in the general vicinity of the source UE, for example) configured to provide their respective sensing information.

The source UE obtains the destination UE's resource information (block 607). The resource information may be in the form of channel quality information, e.g., a CQI from the destination UE. In this operation, the source UE obtains channel quality information from its intended receiver (i.e., the destination UE). If the resource information is unavailable from the destination UE, the source UE may be limited to using its own sensing information (as determined in block 605), for example. The source UE may also use historic information related to previous sidelink transmissions with the destination UE. If only sensing information is available, the resource selection procedure may revert to a broadcast selection procedure.

The obtaining of the destination UE's resource information may be achieved in several ways, including (but not limited to):
  The source UE receives a message indicating the quality of each resource (e.g., a time-frequency map of resources that are deemed good, a matrix of RSRP values, a frequency only map of resources, etc.);
  The source UE receives CQI feedback from the destination UE with a procedure similar to the one described in 3GPP TS38.214, Section 5.2.2, which is hereby incorporated herein by reference in its entirety;
  The source UE receives RI feedback from the destination UE;
  The source UE assumes that the PRBs used by the destination UE for previous transmissions are adequate for the destination UE (i.e., the source UE uses historical information or HARQ feedback); or
  The source UE uses previous transmissions from the destination UE to estimate the channel based on channel reciprocity if the band for sidelink transmission is time division duplexed (TDD), unlicensed, or designated for vehicular operations, as an example.

The source UE generates a selection probability for each resource (block 609). The source UE determines a selection probability for each time-frequency resource (subchannel or slot, for example) within the resource selection window. Information obtained in the previous two blocks (blocks 605 and 607) may be used to determine the probabilities, for example. If no resource information from the destination UE was obtained in block 607, the source UE relies on sensing information only. The generation of the selection probability is discussed in detail later, and several solutions will be provided.

All UEs should report and utilize the CQI in the same manner. If UEs were to use the CQI in a non-specified way, some UE utilizations of the CQI may not be beneficial to the overall system performance. As an example, if a source UE selects a resource mostly based on CQI and with a lower weight for the sensing results, this particular source UE could generate high interference for neighboring UEs, which may not be using the CQI in the same way.

The source UE selects a resource in accordance with the probability of selection (block 611) and transmits over the selected resource (block 613). The source UE selects a resource, i.e., a slot or subchannel combination, based on the probabilities generated in block 609. As an example, the source UE selects the resource with the highest selection probability. In a situation where multiple resources have substantially equal selection probability (and their selection probabilities are the highest), the source UE may randomly select from the multiple resources. Alternatively, in the situation where multiple resources have substantially equal selection probability, the source UE may select from the multiple resources in accordance with historical information. For example, if historical information indicates that transmissions over one particular resource of the multiple resources has resulted in better success rates, the source UE may select the one particular resource. As another example, if historical information indicates that transmissions over one particular resource of the multiple resources has resulted in lower success rates, the source UE may select one of the other multiple resources.

However, in practice, a source UE often requires more than one resources or subchannels (e.g., d subchannels where d is an integer value greater than or equal to 1). There are benefits in having the subchannel contiguous in frequency, such as reduced maximum power reduction (MPR) that arise when transmitting over contiguous resources as compared to transmitting over non-contiguous resources. The source UE may select multiple channels as follows: the source UE selects one subchannel according to the procedure previously discussed (e.g., the technique shown in FIG. 6) using selection probabilities, resource information, such as channel relative quality, etc. The source UE then checks to determine if this resource has enough adjacent subchannels to occupy d resources (the source UE needs to check up to d−1 resource combinations, for example). If it is the case, the source UE selects the identified set of d resources. Because up to d−1 resources are possible, the source UE may decide to select the best set if more than one resource sets are available. If a sufficient number of adjacent subchannels is not available, the source UE performs the resource selection procedure again to select a different resource until a set of d resources is available (or a counter that is used to avoid infinite loops expires, for example).

A sensed resource detected by the source UE may appear to be bad for several reasons, including (but not limited to):
  The channel is bad, due to blockage or deep fade, for example; or There is a strong interferer occupying the same resource (s).

According to an example embodiment, channel information is used to mitigate bad channel condition. As discussed previously, channel information may be in form of CQI received from the destination UE or sensing information when channel quality information is not received from the destination UE. It is also possible for the source UE to use both CQI and sensing information.

In order to discuss the mitigation of bad channel condition when CQI is available, a situation is considered, where the source UE has received the CQI in frequency, along with the following:

The carrier frequency is split into N bins, each bin being: a subchannel, a PRB, a set of PRBs, etc.;

The source UE has received CQI on M bins, where M≤N. For instance, the CQI has been evaluated only on a given resource pool that does not cover the entire frequency span of the carrier. Alternatively, the CQI has been obtained for more than one subchannel, and/or is a wideband channel quality information report; and The CQI at least includes: a quality measurement c on a bin, such as: received signal strength indicator (RSSI), reference signal received power (RSRP), reference signal received quality (RSRQ), signal plus interference to noise ratio (SINR), signal to noise ratio (SNR), etc. Measurement on bin i is referred to as $c_i$. In addition, the channel quality information could include a PMI, a RI, etc.

Furthermore, it is assumed that the source UE has obtained sensing information and has determined the resources that can be used in the resource selection window. The resource selection window may be represented by a P×K matrix $R=[R_{i,j}]$, where:

P is the number of slots in the resource selection window;

K is the number of subchannels in the resource pool where the source UE can transmit; and $R_{i,j}=1$ if the resource was sensed as being of acceptable quality, and 0 otherwise.

Representations other than a matrix can be used, but are conceptually equivalent. In addition, the total number of resources in the resource selection window is denoted as U ($U=\Sigma_{i=1}^{P}\Sigma_{j=1}^{K}R_{i,j}$). An example embodiments presented in this disclosure skews (or modifies) the probabilities of selecting resources based on the availability of the channel quality information.

With regard to a one-dimensional (1-D) bias, the source UE assumes that the CQI is constant for the entire duration of the channel selection window, and that the CQI has the same validity whether the source UE selects a resource early or late in the selection window. This corresponds to the case where the duration of the selection window is much smaller than the channel coherence time, as in e.g., low mobility scenarios. The procedure applied by the source UE is as follows:

Determine the channel relative quality as follows:
Assume that S is the set of subchannels for which CQI is known (S comprises M subchannels),
Define the average CQI as $$\bar{c} = \frac{1}{M}\Sigma_{k\in S} c_i,$$

The channel relative quality on bin i (i∈S) is $\bar{c}_i=c_i/\bar{c}$.

It is possible for $\bar{c}$ to be averaged in a different way (e.g., harmonic, geometric, weighed, and so on). The averaging could be done with linear values or logarithmic values. Amplitudes of the channel relative quality may be defined with a function different from a simple normalization by the average CQI: for instance, $c_i$ could be defined as $\bar{c}_i=(c_i/\bar{c})^z$, where z is a parameter chosen to give more or less weight to bins where the channel is better or worse than the average (with z>1, for example, more weight is given to channels with above average quality).

The channel relative quality can be interpreted and used as follows:

When $\bar{c}_i$ is larger than one, the channel is better than average. Thus, the source UE may be at an advantage when selecting this resource.

When $\bar{c}_i$ is lower than one, the channel is worse than average. Thus the source UE may be at an disadvantage when selecting this resource. For the resources where the source UE does not have CQI, several UE behaviors are possible:

Option 1: The resource with no CQI is not considered for selection. This solution is appropriate when the UE already has CQI on a large number of subchannels.

Option 2: The resource with no CQI is selected with an unskewed probability. In other words, the channel relative quality is assumed to be 1 on this subchannel (subchannel without CQI).

A discussion of a process for skewing the probability for resource selection is described using Option 2. A similar process exists for Option 1.

In order to skew the probability of resource selection for Option 2, it is first assumed that $\bar{c}$ is now of length K and covers the entire span of the resource pool by using the following rules: If CQI is available for subchannel i, the previous definition applies ($\bar{c}_i=c_i/\bar{c}$), otherwise, $\bar{c}_i=1$. The P×K matrix $Q=[q_{i,j}]$, providing the probability of selecting a given time-frequency resource, is defined as follows:

$$q_{i,j} = \alpha \frac{\bar{c}_j R_{i,j}}{U},$$

where α is a normalization coefficient to ensure that the probabilities $q_{i,j}$ are normalized and is expressible as:

$$\alpha=(1/U\Sigma_{i=1}^{P}\Sigma_{j=1}^{K}\bar{c}_j R_{i,j})^{-1}.$$

The source UE now has a probability value for each resource and can select a subchannel accordingly.

Several variations of the example embodiments include:

The CQI is quantized. In that case, the procedure is applied as described above. However, in case of heavy quantization, the evaluated mean value might not be as accurate (due to quantization error, for example). The procedure to determine the selection probability can be simplified: for instance, for all the subchannels where the CQI is received at the highest (or the top N %) value, the selection probability is boosted by a given factor or specified value. For the subchannels where the CQI is received at the lowest (or the bottom L %) value, the selection probability is reduced by a given factor or specified value. For the subchannels where CQI is not available, the selection probability is set to a nominal value. For example:

The nominal value is the selection probability that would be used if only sensing information was available (e.g., 1/U).

The nominal value is associated with the transmission priority and/or service associated with the transmission.

The nominal value is communicated to the source UE by radio resource control (RRC) or PC5 RRC signaling. The nominal value could be on a per UE basis, per resource pool basis, per BWP basis, or per carrier basis.

The CQI is defined taking several variables into account: RSRP, RSRP+RSRQ, etc. While the actual equations for $q_{i,j}$ and $\alpha$ would be different, the procedure for skewing the selection probability for resource selection would be similar.

The procedure is performed with a different granularity: for instance, if the source UE requires d resources, the granularity in frequency could be d.

Figure 7:
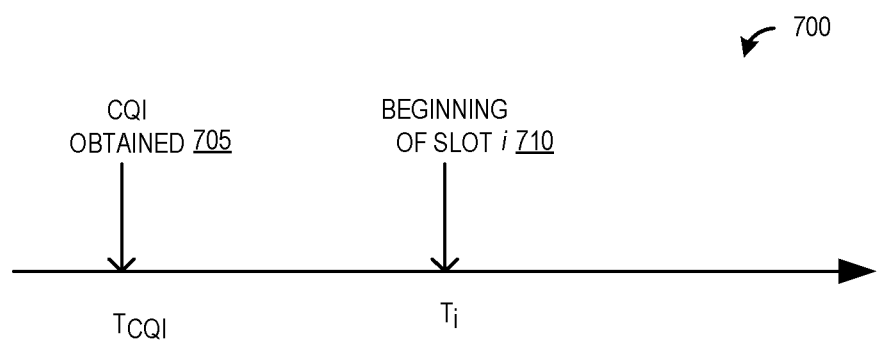
FIG. 7 illustrates a timing diagram highlighting a timing of when the channel quality information (CQI) is obtained relative to a beginning of a slot according to example embodiments presented herein.

In an embodiment, compensation for the age of the CQI is provided. In the discussion presented above, the CQI is assumed to be constant over time (e.g., constant over a 1 second period). In practice, the CQI becomes outdated over time and is generally becomes irrelevant after the channel coherence time. Thus, in such a case, it is possible to define a P×K matrix $C=[\bar{c}_{i,j}]$. As an example, the coefficient $\bar{c}_{i,j}$ is derived as follows, using the notation presented in FIG. 7, which illustrates a timing diagram 700 highlighting a timing of when the CQI is obtained 705, relative to a start of a slot i 710:

$$\bar{c}_{i,j} = \bar{c}_J - \frac{(T_i - T_{CQI})}{(T_{MAX} - T_{CQI})}(\bar{c}_j - 1)$$

if $T_i < T_{max}$, where $T_{max}$ is a known quantity by the source UE.

$\bar{c}_{i,j} = 1$ otherwise.

In other words, $\bar{c}_{i,j}$ is obtained by tapering off the CQI until it converges to its average value (e.g., 1). As shown above, the tapering function is $$\frac{(T_i - T_{CQI})}{(T_{MAX} - T_{CQI})}.$$

Other tapering functions can be used.

In an embodiment, when CQI is not available, the source UE may use sensing information. As an example, due to the TDD nature of the sidelink, the source UE is able to use channel reciprocity to obtain quality information about the subchannels and determine which subchannels are good. In an embodiment, the procedure for mitigating bad channel condition is as discussed previously. However, the source UE estimates the channels itself (e.g., using a DMRS) instead of utilizing channel quality information reported by the destination UE. The source UE determines the $\bar{c}_{i,j}$ values based on its own estimation.

In an embodiment, a simpler procedure involves the source UE assuming that if a destination UE uses a given subchannel, the subchannel is good for the destination UE. Thus, the source UE assigns a higher selection probability to the channels used by the destination UE. Therefore, for the 1-D bias solution (extensions to the two-dimensional (2-D) case are straightforward), the values $\bar{c}_i$ may be defined as follows:

$\bar{c}_i = A > 1$ if the destination UE has used the $i^{th}$ subchannel for a previous transmission.

$\bar{c}_i = 1$ if the destination UE has not used the $i^{th}$ subchannel for a previous transmission.

The remainder of the process may be as described previously.

The process described above utilized the assumption that the source UE has obtained the sensing information and has determined the resources that can be used in the resource selection window.

According to an example embodiment, a technique for resource selection where the source UE has obtained the sensing information but has not yet determined the resources that can be used in the resource selection window is provided. The source UE may use the CQI to reduce the SL-RSRP channel quality values (examples of the sensing information) obtained from sensing. This technique is referred to as artificial SL-RSRP boosting. As an example, if the channel quality is sensed to be X dB over the average channel quality for subchannel i, the source UE artificially reduces the SL-RSRP channel quality values by X dB before selecting the resources that can be used in the resource selection window. If additional weight is given to resources that the destination UE has used before, the SL-RSRP channel quality values can be reduced by YdB (where Y is greater than X, for example). Then, when the source UE selects the set of resources available for resource selection, the resources with reduced SL-RSRP channel quality values have a higher chance of being part of the set of resources.

Figure 8:
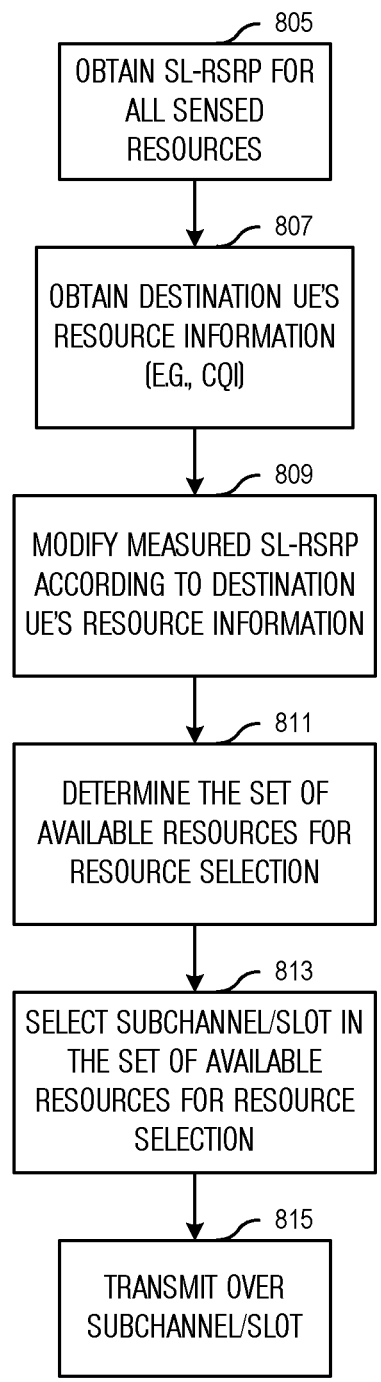
FIG. 8 illustrates a flow diagram of example operations occurring in a source UE utilizing artificial sidelink received signal received power (SL-RSRP) channel quality value boosting according to example embodiments presented herein.

FIG. 8 illustrates a flow diagram of example operations 800 occurring in a source UE utilizing artificial SL-RSRP channel quality value boosting. Operations 800 includes the source UE obtaining SL-RSRP channel quality values for sensed resources and modifying the SL-RSRP channel quality values in accordance with CQI provided by the destination UE. The determining of the set of resources and the resource selection may be as described previously.

Operations 800 begin with the source UE obtaining sensing information, e.g., SL-RSRP channel quality values (block 805). The source UE may obtain the sensing information in a manner similar to the source UE obtaining sensing information in LTE V2X mode 4, for example. As an example, the source UE monitors the channel for a specified amount of time, e.g., 1 second. The source UE obtains SAs and measures corresponding SL-RSRP energy in order to obtain sensing information.

The source UE obtains the destination UE's resource information (block 807). The resource information may be in the form of channel quality information, e.g., a CQI from the destination UE. In this operation, the source UE obtains channel quality information from its intended receiver (i.e., the destination UE). If the resource information is unavailable from the destination UE, the source UE may be limited to using its own sensing information (as determined in block 805), for example. The source UE may also use historic information (e.g. HARQ results) related to previous sidelink transmissions with the destination UE. If only sensing information is available, the resource selection procedure may revert to a broadcast selection procedure.

The source UE modifies the SL-RSRP channel quality values in accordance with the destination UE's resource information (block 809). The source UE may modify the SL-RSRP channel quality values based on resource information, e.g., CQI, provided by the destination UE. As an example, if the CQI for a particular resource is reported by the destination UE as being above a specified threshold (e.g., the average channel quality), the source UE boosts the SL-RSRP channel quality value associated with the particular resource. As another example, if the CQI for a particular resource is reported as being below a specified threshold, the source UE reduces the SL-RSRP channel quality value associated with the particular resource. In an embodiment, the amount of boost (or reduction) of the SL-RSRP channel quality value is dependent on how much better (or worst) the CQI of a particular resources is when compared to the particular threshold.

The source UE determines a set of available resources (block 811). The source UE may determine the set of available resources by selecting resources with the SL-RSRP channel quality value meeting a particular threshold. As an example, resources with the SL-RSRP channel quality value in the lowest 20% of SL-RSRP channel quality values are members of the set of available resources. Other values or criteria are possible.

The source UE selects a resource from the set of available resources (block 813) and transmits over the selected resource (block 815). The source UE selects a resource, i.e., a slot or subchannel combination, from the set of available resources. As an example, the source UE selects the resource with the lowest SL-RSRP channel quality value. In a situation where multiple resources have substantially equal SL-RSRP channel quality value (and their values are the lowest), the source UE may randomly select from the multiple resources. Alternatively, in the situation where multiple resources have substantially equal SL-RSRP channel quality value, the source UE may select from the multiple resources in accordance with historical information. For example, if historical information indicates that transmissions over one particular resource of the multiple resources has resulted in better success rates, the source UE may select the one particular resource. As another example, if historical information indicates that transmissions over one particular resource of the multiple resources has resulted in lower success rates, the source UE may select one of the other multiple resources.

According to an example embodiment, the CQI received from the destination UE is combined with the sensing information to augment the sensing results. The combined information augments the sensing information with added perspective of the destination UE. The following observations are made:

Observation 1. If the source UE senses high energy on resource A but the destination UE reports low energy on resource A, an interfering UE is probably in an opposite direction from that of the destination UE (e.g., ordered left to right: interfering UE, source UE, destination UE). In this situation, resource A can be selected in some cases.

Observation 2. If the source UE senses high energy on resource A and the destination UE reports high energy on resource A, an interfering UE is probably in same direction as that of the destination UE. The interfering UE is probably located in-between the source UE and the destination UE (e.g., ordered left to right: source UE, interfering UE, destination UE). In this situation, resource A should not be selected.

Observation 3. If the source UE senses low energy on resource A but the destination UE reports high energy on resource A, an interfering UE is probably located in same direction as that of the destination UE (e.g., ordered left to right: source UE, destination UE, interfering UE). In this case, resource A should not be selected.

Observation 4. If the source UE senses low energy on resource A and the destination UE reports low energy on resource A, then no interfering UE is likely present. In this case, resource A can be selected.

Based on Observation 3, a source UE excludes resources from consideration if bad CQI is reported for the resources. Based on Observation 1, a source UE excludes resources that as marked as high energy. These resources are excluded for the destination UE only, but not for all UEs. Thus, a modified set of available resources for transmission is determined from the initial set of available resources for transmission.

Figure 9:
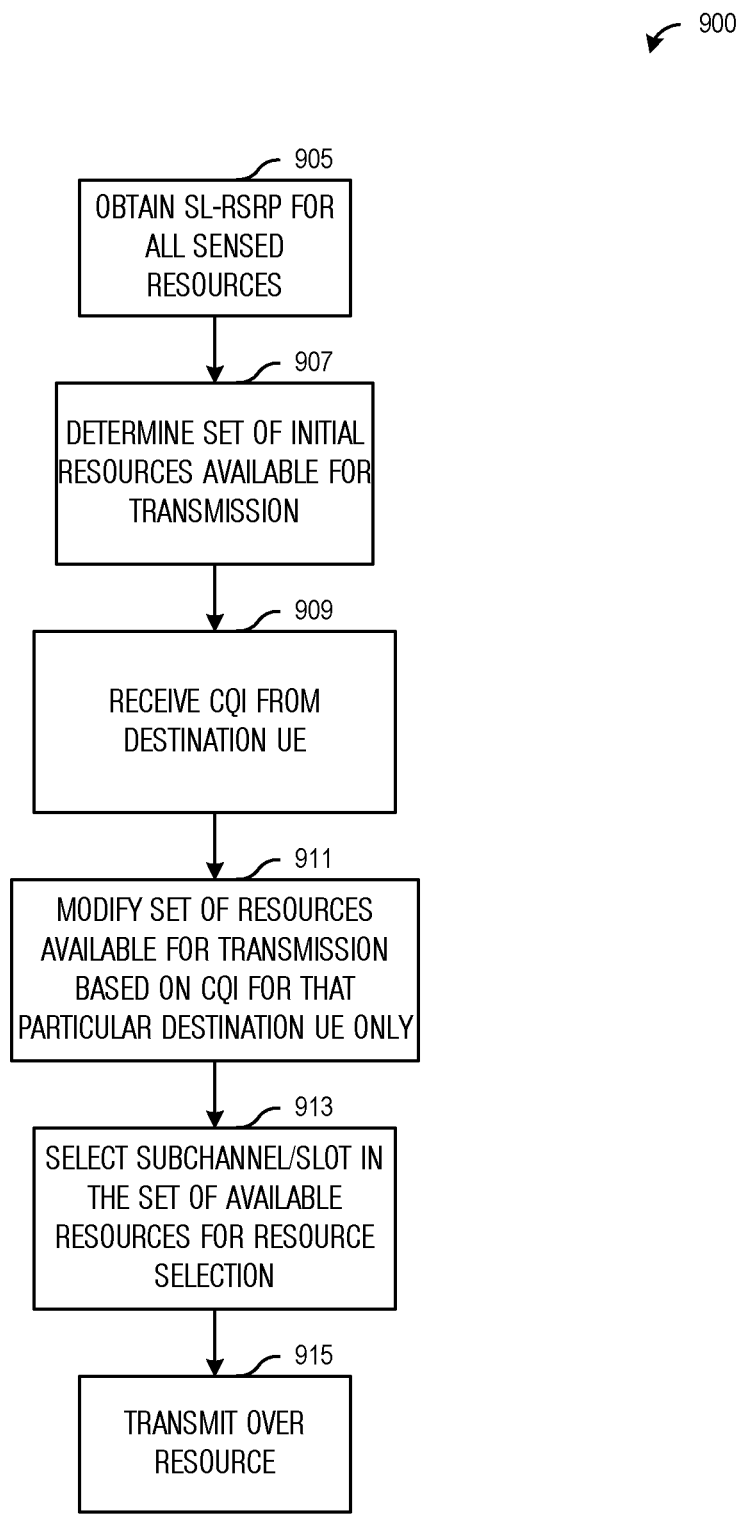
FIG. 9 illustrates a flow diagram of example operations occurring in a source UE augmenting sensing information with received CQI according to example embodiments presented herein.

FIG. 9 illustrates a flow diagram of example operations 900 occurring in a source UE augmenting sensing information with received CQI. After determining sensing information, determining a set of resources, and receiving CQI, the source UE modifies (or augments) the set of resource in accordance with the sensing information and the received CQI. As an example, the source UE excludes resources associated with received CQI indicating bad channel condition. As another example, the source UE excludes resources with received channel quality information that labels the resources as having high energy. The resource selection may be as described previously.

Operations 900 begin with the source UE obtaining sensing information, e.g., SL-RSRP channel quality values (block 905). The source UE may obtain the sensing information in a manner similar to the source UE obtaining sensing information in LTE V2X mode 4, for example. As an example, the source UE monitors the channel for a specified amount of time, e.g., 1 second. The source UE obtains SAs and measures corresponding SL-RSRP energy in order to obtain sensing information.

The source UE determines a set of initial resources available for transmission (block 907). The source UE may determine the set of initial resources by selecting resources with the SL-RSRP channel quality value meeting a particular threshold. As an example, resources with the SL-RSRP channel quality value in the lowest 20% of SL-RSRP channel quality values are members of the set of available resources. Other values or criteria are possible. The set of initial resources may be subject to re-selection or re-evaluation. As an example, the set of initial resource is modified in accordance with information (e.g., channel quality information, CQI, etc.) provided by the destination UE.

The source UE obtains the destination UE's resource information (block 909). The resource information may be in the form of channel quality information, e.g., a CQI from the destination UE. In this operation, the source UE obtains channel quality information from its intended receiver (i.e., the destination UE). If the resource information is unavailable from the destination UE, the source UE may be limited to using its own sensing information (as determined in block 905), for example. The source UE may also use historic information related to previous sidelink transmissions with the destination UE. If only sensing information is available, the resource selection procedure may revert to a broadcast selection procedure.

The source UE modifies the set of initial resources available for transmission (block 911). The source UE modifies the set of initial resources available for transmission in accordance with resource information, e.g., CQI, received from the destination UE. As an example, if the CQI associated with a particular resource indicates high energy or bad channel condition, the source UE eliminates the resource from the set of initial resources. As another example, if the sensing information for a particular resource indicates low energy but the CQI associated with the particular resource indicates high energy or bad channel condition, the source UE eliminates the resource from the set of initial resource for the destination UE only. The modified set of initial resources may be referred to as the set of available resources.

The source UE selects a resource from the set of available resources (block 913) and transmits over the resource (block 915). The source UE selects a resource, i.e., a slot or subchannel combination, from the set of available resources. As an example, the source UE selects the resource with the lowest SL-RSRP channel quality value. In a situation where multiple resources have substantially equal SL-RSRP channel quality value (and their values are the lowest), the source UE may randomly select from the multiple resources. Alternatively, in the situation where multiple resources have substantially equal SL-RSRP channel quality value, the source UE may select from the multiple resources in accordance with historical information. For example, if historical information indicates that transmissions over one particular resource of the multiple resources has resulted in better success rates, the source UE may select the one particular resource. As another example, if historical information indicates that transmissions over one particular resource of the multiple resources has resulted in lower success rates, the source UE may select one of the other multiple resources.

In an embodiment, the example embodiments are extended to groupcast operation by combining the information received from multiple destination UEs. A priority of a given individual packet may also be taken into consideration in the selection of resources. As an example, the decision of whether to select a resource may be made using a 2-D lookup table, with the decision being made considering the sensing information and the received channel quality information from the destination UEs involved in the groupcast.

In a situation where wideband channel quality information is reported (a single value), the source UE may infer that there is a strong interferer near the destination UE. One way to take advantage of this situation is if the destination UE reports the wideband channel quality information with the periodicity of the worst interferer on a time slot occupied with the channel quality information, the source UE can mark the resources with that periodicity as unavailable and skip them when performing resource selection.

Figure 10:
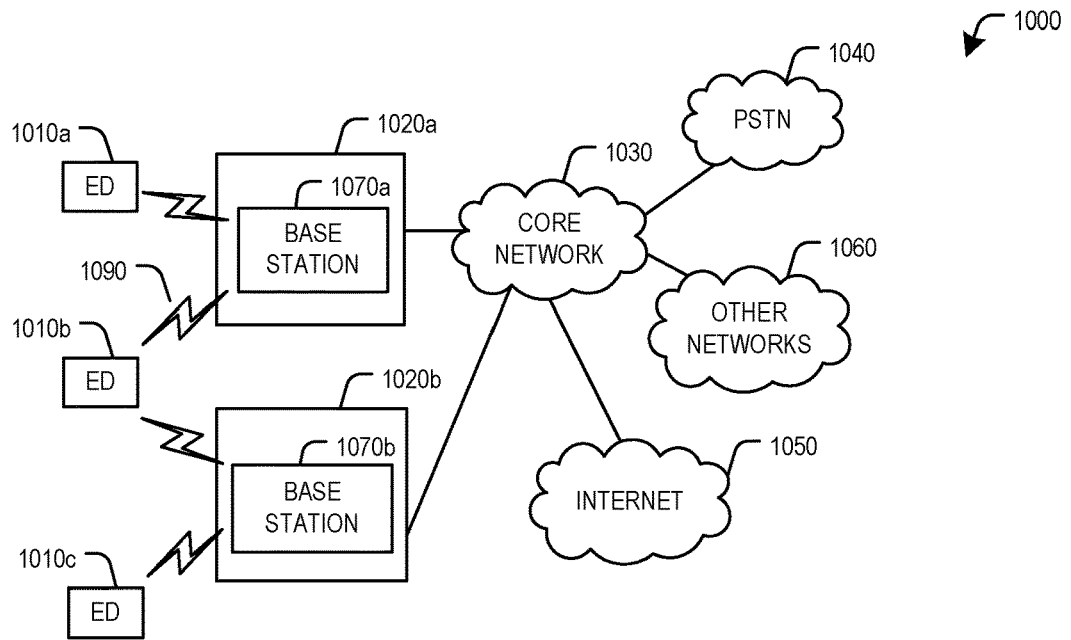
FIG. 10 illustrates an example communication system according to example embodiments presented herein.

FIG. 10 illustrates an example communication system 1000. In general, the system 1000 enables multiple wireless or wired users to transmit and receive data and other content. The system 1000 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 1000 includes electronic devices (ED) 1010a-1010c, radio access networks (RANs) 1020a-1020b, a core network 1030, a public switched telephone network (PSTN) 1040, the Internet 1050, and other networks 1060. While certain numbers of these components or elements are shown in FIG. 10, any number of these components or elements may be included in the system 1000.

The EDs 1010a-1010c are configured to operate or communicate in the system 1000. For example, the EDs 1010a-1010c are configured to transmit or receive via wireless or wired communication channels. Each ED 1010a-1010c represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 1020a-1020b here include base stations 1070a-1070b, respectively. Each base station 1070a-1070b is configured to wirelessly interface with one or more of the EDs 1010a-1010c to enable access to the core network 1030, the PSTN 1040, the Internet 1050, or the other networks 1060. For example, the base stations 1070a-1070b may include (or be) one or more of several well-known devices, such as a base transceiver station (BTS), a Node-B (NodeB), an evolved NodeB (eNodeB), a Next Generation (NG) NodeB (gNB), a Home NodeB, a Home eNodeB, a site controller, an access point (AP), or a wireless router. The EDs 1010a-1010c are configured to interface and communicate with the Internet 1050 and may access the core network 1030, the PSTN 1040, or the other networks 1060.

In the embodiment shown in FIG. 10, the base station 1070a forms part of the RAN 1020a, which may include other base stations, elements, or devices. Also, the base station 1070b forms part of the RAN 1020b, which may include other base stations, elements, or devices. Each base station 1070a-1070b operates to transmit or receive wireless signals within a particular geographic region or area, sometimes referred to as a "cell." In some embodiments, multiple-input multiple-output (MIMO) technology may be employed having multiple transceivers for each cell.

The base stations 1070a-1070b communicate with one or more of the EDs 1010a-1010c over one or more air interfaces 1090 using wireless communication links. The air interfaces 1090 may utilize any suitable radio access technology.

It is contemplated that the system 1000 may use multiple channel access functionality, including such schemes as described above. In particular embodiments, the base stations and EDs implement 5G New Radio (NR), LTE, LTE-A, or LTE-B. Of course, other multiple access schemes and wireless protocols may be utilized.

The RANs 1020a-1020b are in communication with the core network 1030 to provide the EDs 1010a-1010c with voice, data, application, Voice over Internet Protocol (VoIP), or other services. Understandably, the RANs 1020a-1020b or the core network 1030 may be in direct or indirect communication with one or more other RANs (not shown). The core network 1030 may also serve as a gateway access for other networks (such as the PSTN 1040, the Internet 1050, and the other networks 1060). In addition, some or all of the EDs 1010a-1010c may include functionality for communicating with different wireless networks over different wireless links using different wireless technologies or protocols. Instead of wireless communication (or in addition thereto), the EDs may communicate via wired communication channels to a service provider or switch (not shown), and to the Internet 1050.

Although FIG. 10 illustrates one example of a communication system, various changes may be made to FIG. 10. For example, the communication system 1000 could include any number of EDs, base stations, networks, or other components in any suitable configuration.

Figure 11A:
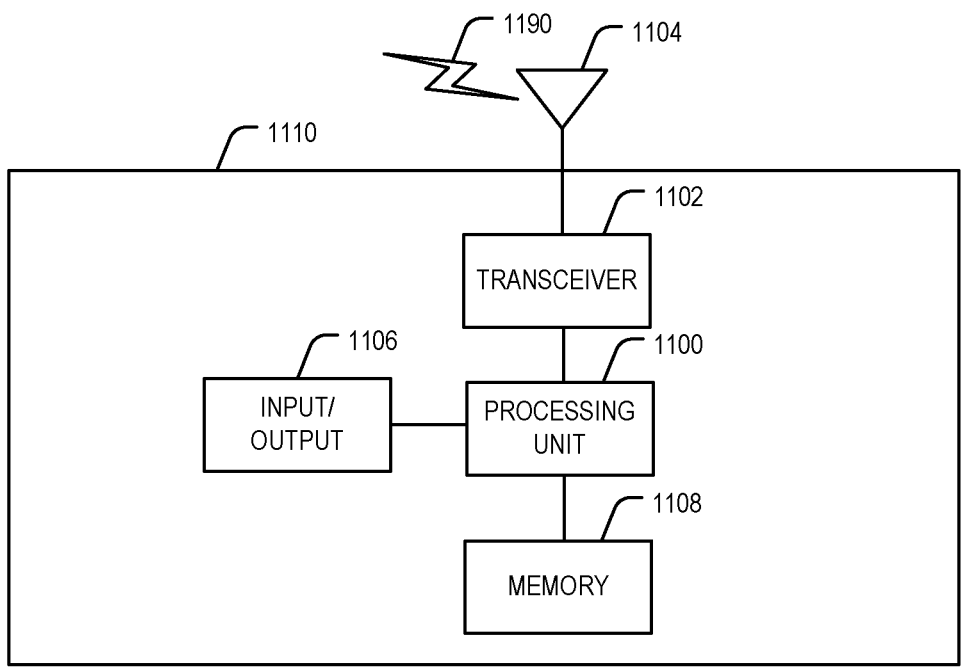
FIGS. 11A and 11B illustrate example devices that may implement the methods and teachings according to this disclosure.
Figure 11B:
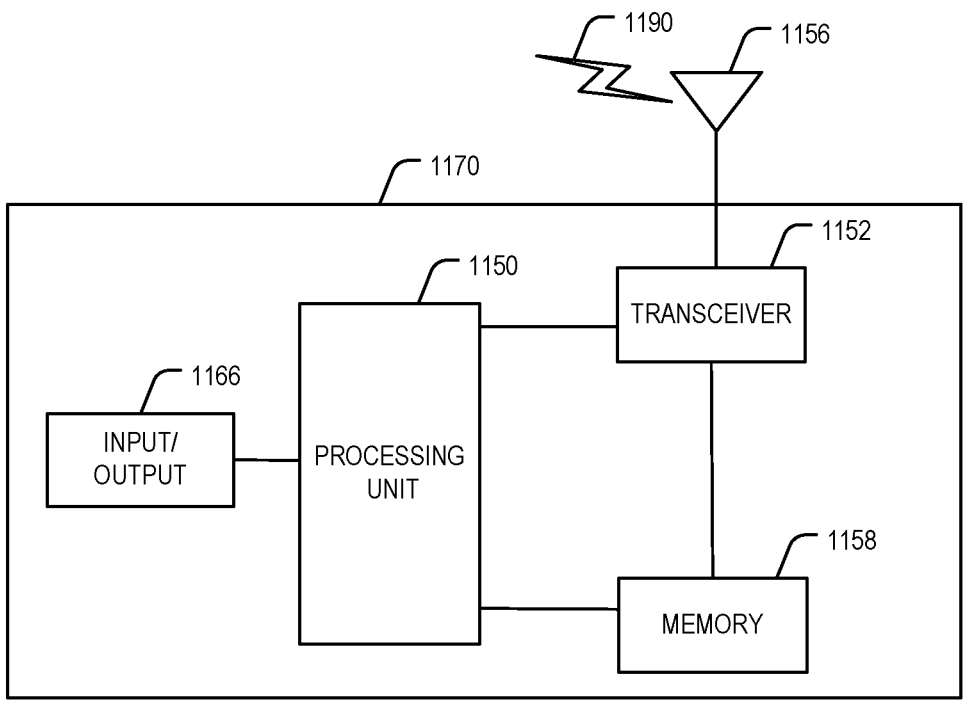

FIGS. 11A and 11B illustrate example devices that may implement the methods and teachings according to this disclosure. In particular, FIG. 11A illustrates an example ED 1110, and FIG. 11B illustrates an example base station 1170. These components could be used in the system 1000 or in any other suitable system.

As shown in FIG. 11A, the ED 1110 includes at least one processing unit 1100. The processing unit 1100 implements various processing operations of the ED 1110. For example, the processing unit 1100 could perform signal coding, data processing, power control, input/output processing, or any other functionality enabling the ED 1110 to operate in the system 1000. The processing unit 1100 also supports the methods and teachings described in more detail above. Each processing unit 1100 includes any suitable processing or computing device configured to perform one or more operations. Each processing unit 1100 could, for example, include a microprocessor, microcontroller, digital signal processor, field programmable gate array, or application specific integrated circuit.

The ED 1110 also includes at least one transceiver 1102. The transceiver 1102 is configured to modulate data or other content for transmission by at least one antenna or NIC (Network Interface Controller) 1104. The transceiver 1102 is also configured to demodulate data or other content received by the at least one antenna 1104. Each transceiver 1102 includes any suitable structure for generating signals for wireless or wired transmission or processing signals received wirelessly or by wire. Each antenna 1104 includes any suitable structure for transmitting or receiving wireless or wired signals. One or multiple transceivers 1102 could be used in the ED 1110, and one or multiple antennas 1104 could be used in the ED 1110. Although shown as a single functional unit, a transceiver 1102 could also be implemented using at least one transmitter and at least one separate receiver.

The ED 1110 further includes one or more input/output devices 1106 or interfaces (such as a wired interface to the Internet 1050). The input/output devices 1106 facilitate interaction with a user or other devices (network communications) in the network. Each input/output device 1106 includes any suitable structure for providing information to or receiving information from a user, such as a speaker, microphone, keypad, keyboard, display, or touch screen, including network interface communications.

In addition, the ED 1110 includes at least one memory 1108. The memory 1108 stores instructions and data used, generated, or collected by the ED 1110. For example, the memory 1108 could store software or firmware instructions executed by the processing unit(s) 1100 and data used to reduce or eliminate interference in incoming signals. Each memory 1108 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 1B, the base station 1170 includes at least one processing unit 1150, at least one transceiver 1152, which includes functionality for a transmitter and a receiver, one or more antennas 1156, at least one memory 1158, and one or more input/output devices or interfaces 1166. A scheduler, which would be understood by one skilled in the art, is coupled to the processing unit 1150. The scheduler could be included within or operated separately from the base station 1170. The processing unit 1150 implements various processing operations of the base station 1170, such as signal coding, data processing, power control, input/output processing, or any other functionality. The processing unit 1150 can also support the methods and teachings described in more detail above. Each processing unit 1150 includes any suitable processing or computing device configured to perform one or more operations. Each processing unit 1150 could, for example, include a microprocessor, microcontroller, digital signal processor, field programmable gate array, or application specific integrated circuit.

Each transceiver 1152 includes any suitable structure for generating signals for wireless or wired transmission to one or more EDs or other devices. Each transceiver 1152 further includes any suitable structure for processing signals received wirelessly or by wire from one or more EDs or other devices. Although shown combined as a transceiver 1152, a transmitter and a receiver could be separate components. Each antenna 1156 includes any suitable structure for transmitting or receiving wireless or wired signals. While a common antenna 1156 is shown here as being coupled to the transceiver 1152, one or more antennas 1156 could be coupled to the transceiver(s) 1152, allowing separate antennas 1156 to be coupled to the transmitter and the receiver if equipped as separate components. Each memory 1158 includes any suitable volatile or non-volatile storage and retrieval device(s). Each input/output device 1166 facilitates interaction with a user or other devices (network communications) in the network. Each input/output device 1166 includes any suitable structure for providing information to or receiving/providing information from a user, including network interface communications.

Figure 12:
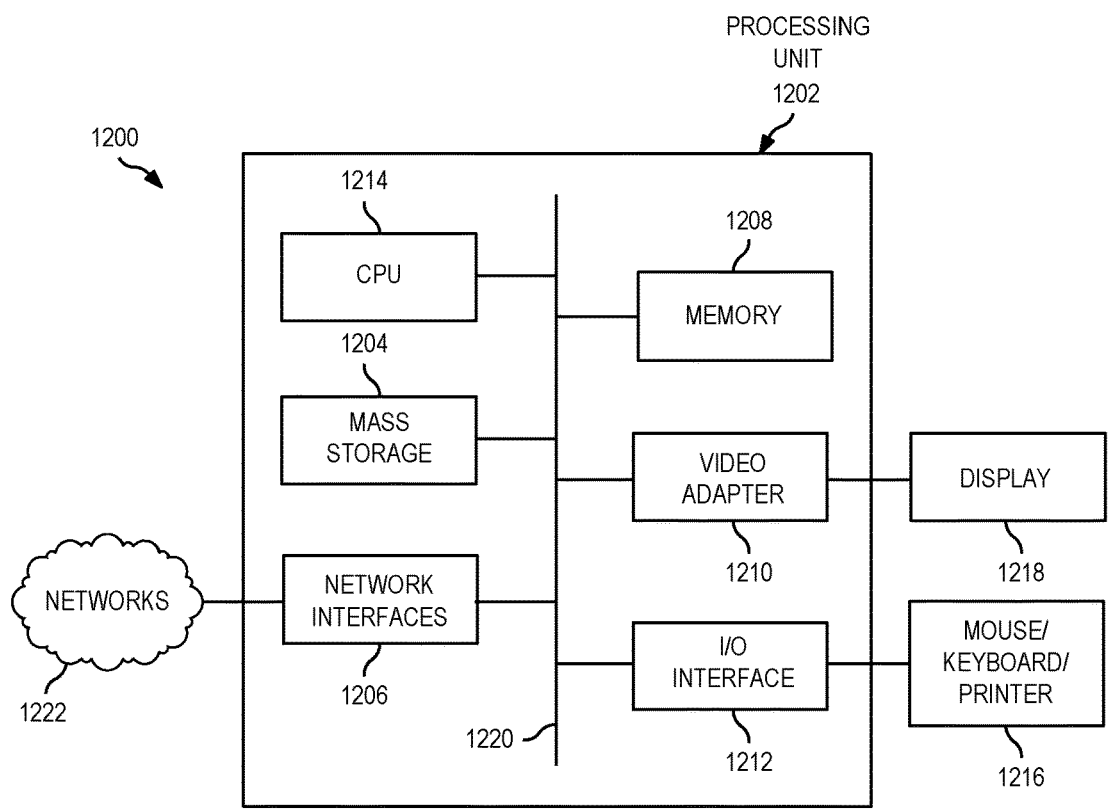
FIG. 12 is a block diagram of a computing system that may be used for implementing the devices and methods disclosed herein.

FIG. 12 is a block diagram of a computing system 1200 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1200 includes a processing unit 1202. The processing unit includes a central processing unit (CPU) 1214, memory 1208, and may further include a mass storage device 1204, a video adapter 1210, and an I/O interface 1212 connected to a bus 1220.

The bus 1220 may be one or more of any type of several bus architectures including a memory bus or memory controller, a peripheral bus, or a video bus. The CPU 1214 may comprise any type of electronic data processor. The memory 1208 may comprise any type of non-transitory system memory such as static random access memory (SRAM), dynamic random access memory (DRAM), synchronous DRAM (SDRAM), read-only memory (ROM), or a combination thereof. In an embodiment, the memory 1208 may include ROM for use at boot-up, and DRAM for program and data storage for use while executing programs.

The mass storage 1204 may comprise any type of non-transitory storage device configured to store data, programs, and other information and to make the data, programs, and other information accessible via the bus 1220. The mass storage 1204 may comprise, for example, one or more of a solid state drive, hard disk drive, a magnetic disk drive, or an optical disk drive.

The video adapter 1210 and the I/O interface 1212 provide interfaces to couple external input and output devices to the processing unit 1202. As illustrated, examples of input and output devices include a display 1218 coupled to the video adapter 1210 and a mouse, keyboard, or printer 1216 coupled to the I/O interface 1212. Other devices may be coupled to the processing unit 1202, and additional or fewer interface cards may be utilized. For example, a serial interface such as Universal Serial Bus (USB) (not shown) may be used to provide an interface for an external device.

The processing unit 1202 also includes one or more network interfaces 1206, which may comprise wired links, such as an Ethernet cable, or wireless links to access nodes or different networks. The network interfaces 1206 allow the processing unit 1202 to communicate with remote units via the networks. For example, the network interfaces 1206 may provide wireless communication via one or more transmitters/transmit antennas and one or more receivers/receive antennas. In an embodiment, the processing unit 1202 is coupled to a local-area network 1222 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a performing unit or module, a generating unit or module, an obtaining unit or module, a setting unit or module, an adjusting unit or module, an increasing unit or module, a decreasing unit or module, a determining unit or module, a modifying unit or module, a reducing unit or module, a removing unit or module, or a selecting unit or module. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the scope of the disclosure as defined by the appended claims.

What is claimed is:

1. A method comprising:
    performing, by a first device, sensing to determine resources for a sidelink transmission between the first device and a second device;
    obtaining, by the first device, channel information associated with a first subset of the resources;
    generating, by the first device, resource selection probabilities for a second subset of the resources, the resource selection probabilities being generated in accordance with the channel information and sensing information derived from the sensing;
    selecting, by the first device, a resource from the resources in accordance with the resource selection probabilities; and
    transmitting, by the first device to the second device, the sidelink transmission over the selected resource.

2. The method of claim 1, the generating the resource selection probabilities comprising:
    setting, by the first device, resource selection probabilities of resources having sensing information meeting a specified first threshold; and
    adjusting, by the first device, the resource selection probabilities of a third subset of the resources having sensing information meeting a specified second threshold, the adjusting being in accordance with the channel information.

3. The method of claim 2, the adjusting the resource selection probabilities comprising:
    increasing, by the first device, a resource selection probability associated with a first resource when channel information associated with the first resource indicates that the first resource has low energy, and
    decreasing, by the first device, a resource selection probability associated with a second resource when channel information associated with the second resource indicates that the second resource has high energy.

4. The method of claim 1, the selecting the resource comprising:
    selecting the resource having a highest resource selection probability.

5. The method of claim 1, selecting the resource comprising:
    randomly selecting the resource from a plurality of resources having resource selection probability substantially equal to a highest resource selection probability.

6. The method of claim 1, the channel information comprising at least one of channel quality information (CQI) of the resources, quality indicators of the resources, rank indicators (RIs) of the resources, information of the resources used for prior transmissions by the second device, or information estimated in accordance with prior transmissions by the second device.

7. The method of claim 1, the sensing information comprising at least one of a reference signal received power (RSRP) measurement, resource allocation information, or resource reservation information.

8. A method comprising:
    performing, by a first device, sensing to determine resources for a sidelink transmission between the first device and a second device;
    obtaining, by the first device, signal quality information for a first subset of the resources;
    obtaining, by the first device, channel information associated with a second subset of the resources;
    adjusting, by the first device, the signal quality information for a third subset of the resources, the signal quality information being adjusted in accordance with the channel information;
    selecting, by the first device, a resource from the resources in accordance with the adjusted signal quality information; and
    transmitting, by the first device to the second device, the sidelink transmission over the selected resource.

9. The method of claim 8, the selecting the resource comprising:
    determining, by the first device, a set of available resources in accordance with the adjusted signal quality information; and
    selecting, by the first device, the resource from the set of available resources.

10. The method of claim 8, the adjusting the signal quality information comprising:
    modifying, by the first device, the signal quality information for the third subset of the resources in accordance with the channel information.

11. The method of claim 10, the modifying the signal quality information comprising:
    reducing the signal quality information.

12. The method of claim 10, further comprising:
    reducing the signal quality information for a fourth subset of the resources comprising resources used for prior transmissions by the second device.

13. A method comprising:
    performing, by a first device, sensing to determine resources for a sidelink transmission between the first device and a second device;

selecting, by the first device, a first subset of the resources in accordance with sensing information derived from the sensing;

obtaining, by the first device, channel information associated with a second subset of the resources;

modifying, by the first device, the first subset of the resources in accordance with the channel information;

selecting, by the first device, a resource from the resources in accordance with the modified first subset of the resources; and transmitting, by the first device to the second device, the sidelink transmission over the selected resource.

14. The method of claim 13, the modifying the first subset of the resources comprising:
removing the resource from the first subset of the resources when channel information associated with the resource indicates high energy.

15. The method of claim 13, the modified first subset of the resources being associated with the second device.

16. A first device comprising:
one or more processors; and
a non-transitory memory storage comprising instructions that, when executed by the one or more processors, cause the first device to:
perform sensing to determine resources for a sidelink transmission between the first device and a second device;
obtain channel information associated with a first subset of the resources;
generate resource selection probabilities for a second subset of the resources, the resource selection probabilities being generated in accordance with the channel information and sensing information derived from the sensing;
select a resource from the resources in accordance with the resource selection probabilities; and
transmit, to the second device, the sidelink transmission over the selected resource.

17. The first device of claim 16, the instructions further causing the first device to:
set resource selection probabilities of resources having sensing information meeting a specified first threshold; and
adjust the resource selection probabilities of a third subset of the resources having sensing information meeting a specified second threshold in accordance with the channel information.

18. The first device of claim 17, the instructions further causing the first device to:
increase a resource selection probability associated with a first resource when channel information associated with the first resource indicates that the first resource has low energy;
and decrease a resource selection probability associated with a second resource when channel information associated with the second resource indicates that the second resource has high energy.

19. The first device of claim 16, the instructions further causing the first device to:
select the resource having a highest resource selection probability.

20. The first device of claim 16, the instructions further causing the first device to:
randomly select the resource from a plurality of resources having resource selection probability substantially equal to a highest resource selection probability.

21. The first device of claim 16, the channel information comprising at least one of channel quality information (CQI) of the resources, quality indicators of the resources, rank indicators (RIs) of the resources, information of the resources used for prior transmissions by the second device, or information estimated in accordance with prior transmissions by the second device.

22. The first device of claim 16, the sensing information comprising at least one of a reference signal received power (RSRP) measurement, resource allocation information, or resource reservation information.

23. A first device comprising:
one or more processors; and
a non-transitory memory storage comprising instructions that, when executed by the one or more processors, cause the first device to:
perform sensing to determine resources for a sidelink transmission between the first device and a second device;
obtain signal quality information for a first subset of the resources;
obtain channel information associated with a second subset of the resources;
adjust the signal quality information for a third subset of the resources, the signal quality information being adjusted in accordance with the channel information;
select a resource from the resources in accordance with the adjusted signal quality information; and
transmit, to the second device, the sidelink transmission over the selected resource.

24. The first device of claim 23, the instructions further causing the first device to:
determine a set of available resources in accordance with the adjusted signal quality information; and select the resource from the set of available resources.

25. The first device of claim 23, the instructions further causing the first device to:
modify the signal quality information for the third subset of the resources in accordance with the channel information.

26. The first device of claim 25, the instructions further causing the first device to:
reduce the signal quality information.

27. The first device of claim 25, the instructions further causing the first device to:
reduce the signal quality information for a fourth subset of the resources comprising resources used for prior transmissions by the second device.

28. A first device comprising:
one or more processors; and
a non-transitory memory storage comprising instructions that, when executed by the one or more processors, cause the first device to:
perform sensing to determine resources for a sidelink transmission between the first device and a second device;
select a first subset of the resources in accordance with sensing information derived from the sensing;
obtain channel information associated with a second subset of the resources;
modify the first subset of the resources in accordance with the channel information;
select a resource from the resources in accordance with the modified first subset of the resources; and
transmit, to the second device, the sidelink transmission over the selected resource.

29. The first device of claim 28, the instructions further causing the first device to:

remove the resource from the first subset of the resources when channel information associated with the resource indicates high energy.

30. The first device of claim 28, the modified first subset of the resources being associated with the second device.

\* \* \* \* \*